United States Patent
Kempfer et al.

(10) Patent No.: US 10,017,131 B2
(45) Date of Patent: Jul. 10, 2018

(54) PANEL ARRANGEMENT FOR A MOTOR VEHICLE

(71) Applicant: GM GLOBAL TECHNOLOGY OPERATIONS LLC, Detroit, MI (US)

(72) Inventors: Fabian Kempfer, Ruesselsheim (DE); Younes Chlyeh, Ruesselsheim (DE); Peter Zipp, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 23 days.

(21) Appl. No.: 15/195,316

(22) Filed: Jun. 28, 2016

(65) Prior Publication Data

US 2016/0375844 A1 Dec. 29, 2016

(30) Foreign Application Priority Data

Jun. 29, 2015 (DE) .................. 20 2015 004 642

(51) Int. Cl.
*B60R 13/07* (2006.01)
*B62D 25/08* (2006.01)

(52) U.S. Cl.
CPC ............ *B60R 13/07* (2013.01); *B62D 25/081* (2013.01)

(58) Field of Classification Search
CPC .............................. B60R 13/07; B62D 25/081
See application file for complete search history.

(56) References Cited

U.S. PATENT DOCUMENTS

| 5,139,458 | A | 8/1992 | Koukal et al. |
| 2006/0202516 | A1 | 9/2006 | Mori |
| 2015/0015030 | A1 | 1/2015 | Sasaki et al. |

FOREIGN PATENT DOCUMENTS

| DE | 102007017427 A1 | 11/2008 |
| DE | 102011115592 A1 | 4/2013 |
| FR | 2891199 A1 | 3/2007 |
| GB | 1378050 A | 12/1974 |
| JP | 2004203169 A | 7/2004 |
| JP | 2005306070 A | 11/2005 |
| JP | 2011084093 A | 4/2011 |
| WO | 2014136769 A1 | 9/2014 |

OTHER PUBLICATIONS

Mort Schultz, "Finding and Fixing Water and Air Leaks," Popular Mechanics, Jul. 1988, pp. 115-118, vol. 165, No. 7.
Intellectual Property Office, Search Report for United Kingdom Patent Application No. GB1609266.0 dated Nov. 25, 2016.
German Patent Office, German Search Report for German Application No. 202015004642.8, dated Jan. 27, 2016.

*Primary Examiner* — D Glenn Dayoan
*Assistant Examiner* — Melissa A Black
(74) *Attorney, Agent, or Firm* — Lorenz & Kopf, LLP

(57) ABSTRACT

The present disclosure relates to a panel arrangement for a motor vehicle with an air inlet panel for the through-flow with ambient air, and a service panel including a water-collecting region arranged beneath the air passage region. The water-collecting region is constituted for draining water in the vehicle transverse direction, in particular to at least one wheel well of the motor vehicle. Furthermore, the present disclosure relates to a motor vehicle, in particular a passenger car, with such a panel arrangement assembled fixed in the vehicle in the assembly position.

13 Claims, 5 Drawing Sheets

PANEL ARRANGEMENT FOR A MOTOR VEHICLE

CROSS-REFERENCE TO RELATED APPLICATION

This application claims priority to German Patent Application No. 202015004642.8, filed Jun. 29, 2015, which is incorporated herein by reference in its entirety.

TECHNICAL FIELD

The present disclosure pertains to a panel arrangement for a motor vehicle as well as a motor vehicle, in particular a passenger car, with the panel arrangement.

BACKGROUND

DE 10 2007 017 427 A1 discloses a motor vehicle with a water box, a water box cover and a panel, which closes a cut-free region of an end wall at front from above in order to prevent engine vapors from flowing into a passenger compartment. The water box cover includes a channel, which extends over the entire width of the vehicle and is dimensioned such that it can take up all of the water flowing down from a windscreen even with a rainfall amount of 20 liters/(m²·min).

SUMMARY

The present disclosure provides a panel arrangement for a motor vehicle, in particular a passenger car. The panel arrangement includes an air inlet panel having one or more air passage regions with in each case one or more air passages for the through-flow with ambient air, and a service panel with a water-collecting region which, in an assembly position of the panel arrangement is arranged beneath (in the vehicle vertical direction or vertically with a horizontally standing vehicle) or subjacent one or more, in particular all the air passage regions of the air inlet panel or is overlapped completely or partially by the air passage regions. The water-collecting region in the assembly position drains water, in particular water passing through the air passages in the vehicle transverse direction, in particular to one or two wheel wells of the motor vehicle lying opposite one another in the vehicle transverse direction, or is designed, in particular formed, for this purpose.

In one embodiment, water which enters undesirably through the air passage(s) of the air inlet panel—especially when the vehicle, in particular its windscreen, is heavily exposed to the impact of water—can thus advantageously be drained and, in particular, the subjecting to water impact of a water box communicating or connected fluidically with the air inlet panel and/or service panel can thus be reduced, so that entry of water through an air inlet, in particular air-conditioning inlet in the water box, can particularly advantageously be reduced, in the particular prevented. In one embodiment, this can make it possible to reduce a water(-repelling) barrier of the inlet and thus to improve its through-flow, in particular to reduce turbulence, pressure losses and/or noise.

In one embodiment, the air inlet panel adjoins, in particular in a sealing manner, a windscreen of the motor vehicle. In one embodiment, water from the windscreen can thus advantageously be at least partially collected, in particular before entry into the water box. Air passages can be the constituted in particular by perforated regions in the air inlet panel. A plurality of air passages, which are jointly surrounded by an air passage-free region of the air inlet panel, can form or define (in each case) an air passage region of the air inlet panel.

In one embodiment, the service panel can at least partially perform the function of the panel also referred to as "service panel" in DE 10 2007 017 427 A1 or be designed for this purpose, i.e. in particular to cover an opening to an engine compartment of the motor vehicle, but without the term "service panel" within the meaning of the present disclosure being so limited. On the contrary, in one embodiment a panel arrangement within the meaning of the present disclosure includes a first and a second panel, which are referred to as air inlet panel and service panel in the present case without limiting the generalities, so that in the present disclosure the term "air inlet panel" can be replaced by "first panel" and the term "service panel" can be replaced by "second panel".

In one embodiment, the air inlet panel includes a central or middle air passage region with one or more air passages for the through-flow with ambient air. In addition or alternatively, the air inlet panel in one embodiment includes at least one lateral air passage region with one or more air passages for the through-flow with ambient air, in particular two air passage regions lying opposite one another in the vehicle transverse direction, each with one or more air passages for the through-flow with ambient air. In one embodiment, the air inlet panel can thus improve ventilation, in particular of a water box.

In one embodiment, the single-part or multi-part, in particular continuous water-collecting region in the assembly position is arranged beneath two or more, in particular all the air passage regions, in order in this way, in one embodiment, advantageously to drain water which enters undesirably through these air passage regions of the air inlet panel. In one embodiment, the water-collecting region is open on one side or both sides in the vehicle transverse direction, in order to drain water in particular to one or two wheel wells of the motor vehicle lying opposite one another in the vehicle transverse direction. In one embodiment, the water-collecting region communicates fluidically with the wheel wells or is connected to the latter fluidically.

In one embodiment, at least two air passage regions of the air inlet panel are spaced apart in the vehicle transverse direction by at least 2%, in particular at least 4%, of the total extension of the air inlet panel, in particular by (in each case) an air passage-free or, in particular at the bottom side, closed region of air inlet panel, which extends according to one embodiment in the vehicle transverse direction (in each case) over at least 2%, in particular at least 4%, of the total extension of the air inlet panel.

In one embodiment, an advantageous ventilation and/or stiffening can thus be constituted.

In one embodiment, the water-collecting region includes an anterior or front (when viewed in the assembly position in the vehicle longitudinal direction), closed or water-tight end wall for guiding water to be drained. The end wall in the assembly position extends in the vehicle vertical and transverse direction. In a development, it forms with the vehicle vertical direction, continuously or in sections, an angle of at most 45°, in particular at most 30°, in particular at most 15°. In addition or alternatively, the water-collecting region in one embodiment includes a posterior or rear (when viewed in the assembly position in the vehicle longitudinal direction), closed or water-tight end wall for guiding water to be drained. The end wall in the assembly position extends in the vehicle vertical and transverse direction. In a development, it forms with the vehicle vertical direction, continuously or in sections, an angle of at most 45°, in particular at most 30°, in particular at most 15°. In one embodiment, the front end wall and/or the rear end wall extends in the vehicle transverse direction over at least 75%, in particular at least 90%, of a total extension of the service panel in the vehicle transverse direction. In addition or alternatively, the front end wall and/or the rear end wall in one embodiment has, in the vehicle vertical direction, continuously or in sections, a minimum height of at least 3 mm, in particular at least 5 mm.

In one embodiment, water can thus advantageously be drained in the vehicle transverse direction.

In one embodiment, the front end wall and/or the rear end wall is bent or curved convex and/or concave continuously or in sections. Accordingly, an end wall, which in a cross-section parallel to the vehicle longitudinal and transverse direction is inclined, in particular curved, towards the vehicle transverse direction, in particular also extends, in one embodiment within the meaning of the present disclosure, (also) in the vehicle transverse direction. Accordingly, water which is drained or flows (also) in the vehicle transverse direction is drained, in one embodiment within the meaning of the present disclosure, in the vehicle transverse direction.

In one embodiment, the front and the rear end wall diverge from one another at least in sections, in particular in one or both mutually opposite (vehicle)-side end regions and/or over at least 10% of a total extension of the service panel in the vehicle transverse direction.

In one embodiment, the drainage of the water can thus be improved.

In one embodiment, the front and rear end wall are connected together, in particular integrally, by an in particular closed and water-tight bottom wall to form a continuous and/or U-shaped channel in particular in the vehicle transverse direction for the, in particular two-sided, drainage of water in the vehicle transverse direction. The drainage of water can thus be improved in one embodiment.

In one embodiment, the bottom wall, as viewed in the assembly position in the vehicle transverse direction, falls away at least in sections at one or both vehicle sides in the vehicle vertical direction, in particular in a stepped manner and/or in one or both mutually opposite (vehicle)-side end regions and/or over at least 10% of a total extension of the service panel in the vehicle transverse direction. In addition or alternatively, the bottom wall in one embodiment partially or wholly overlaps one or two suspension strut dome(s) of the motor vehicle. In one embodiment, the drainage of the water and/or the connection of the service panel can thus be improved. In addition or alternatively, the bottom wall in one embodiment includes one or two shoulders lying opposite one another in the vehicle transverse direction, said shoulders projecting beyond one or both end walls of the service panel and/or falling away in the vehicle vertical direction and/or being connected, in particular screwed, to a structure of the motor vehicle. In one embodiment, the drainage of the water and/or the connection of the service panel can thus be improved.

In one embodiment, the air inlet panel and/or the service panel is constituted in one piece. In one embodiment, the water drainage in particular can thus be advantageously improved. In addition or alternatively, the air inlet panel and the service panel in one embodiment can be made of plastic, in particular produced therefrom, and in particular originally molded. In one embodiment, the weight can thus advantageously be reduced.

In one embodiment, the air inlet panel includes one or more assembly openings, in particular through-openings, for fixing a windscreen wiper, in particular one or more assembly openings which are each penetrated by a shaft of a windscreen wiper or are designed for this purpose.

In one embodiment, the air inlet panel also drains water, in particular water conveyed from the windscreen and/or passing through a gap between the windscreen and the front bonnet, in the vehicle transverse direction, or is designed, in particular formed, for this purpose.

For this purpose, said air inlet panel can in particular include an anterior or front (—viewed in the assembly position in the vehicle longitudinal direction), closed or water-tight end wall for guiding water to be drained. The end wall in the assembly position extends in the vehicle vertical and transverse direction. In a development it forms with the vehicle vertical direction, continuously or in sections, an angle of at most 45°, in particular at most 30°, in particular at most 15°. In addition or alternatively, the air inlet panel in one embodiment can include a posterior or rear (when viewed in the assembly position in the vehicle longitudinal direction), closed or water-tight end wall for guiding water to be drained. The end wall in the assembly position extends in the vehicle vertical and transverse direction. In a development it forms with the vehicle vertical direction, continuously or in sections, an angle of at most 45°, in particular at most 30°, in particular at most 15°. In one embodiment, the front end wall and/or the rear end wall of the air inlet panel extends in the vehicle transverse direction over at least 75%, in particular at least 90%, of the total extension of the air inlet panel in the vehicle transverse direction. In addition or alternatively, in one embodiment the front end wall and/or the rear end wall of the air inlet panel in the vehicle vertical direction has, continuously or in sections, a minimum height of at least 3 mm, in particular at least 5 mm.

In one embodiment, the drainage of water can thus be advantageously improved, in particular the exposure of the service panel and/or the water box can be reduced.

In one embodiment, the air inlet panel and/or the service panel is connected, in particular screwed, detachably to a structure, in particular the bodywork, of the motor vehicle.

In one embodiment, the assembly/dismantling can thus be improved.

In one embodiment, the motor vehicle includes a water box. In one embodiment, the latter can be constituted by metal sheets, in particular the bodywork of the motor vehicle, and/or can include an air inlet, in particular an air-conditioning inlet.

In one embodiment, a rear end wall of the water box is arranged, at the posterior or rear (when viewed in the vehicle longitudinal direction) of the service panel or in the vehicle longitudinal direction behind in the service panel, in particular in the vehicle longitudinal direction spaced apart from the rear end wall of the service panel towards the vehicle rear. The front end wall of the water box can in one embodiment be arranged at the rear of the service panel or in the vehicle longitudinal direction behind the service panel or also at the front of the service panel or in the vehicle longitudinal direction before the service panel. In addition or alternatively, in one embodiment a bottom wall of the water box, viewed in the vehicle vertical direction, is arranged beneath the service panel, in particular beneath its bottom wall. In one embodiment, the service panel can thus be arranged, in a cross-section parallel to the vehicle longitudinal and vertical direction, in particular before and/or above the water box. In one embodiment, ventilation of the water box via the service panel can thus be improved.

In one embodiment, the water box is ventilated with ambient air via the air inlet panel and/or the service panel or the air inlet panel and/or service panel are designed, in particular formed and/or arranged, for this purpose. In one embodiment, water carried in with ambient air can thus be advantageously drained at least partially before it reaches the water box.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
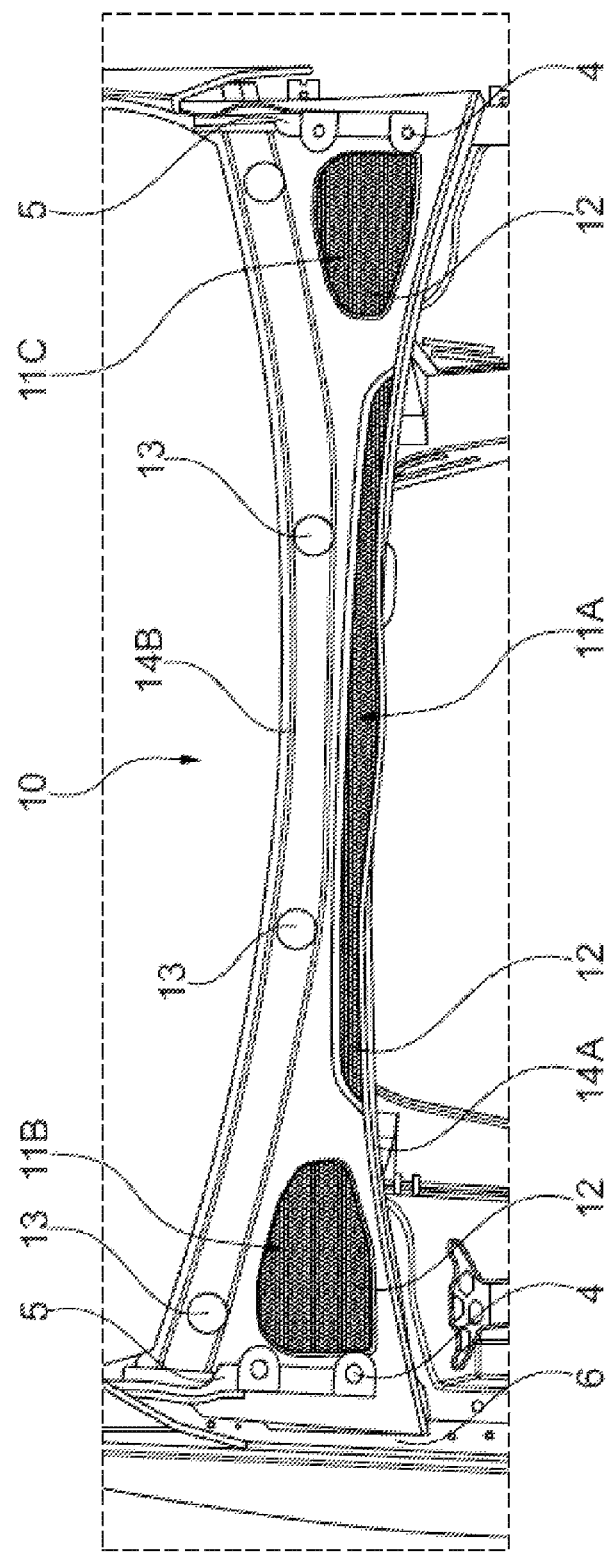
FIG. 1 shows a plan view of a panel arrangement of a motor vehicle according to one embodiment of the present disclosure in the vehicle vertical direction from above.
Figure 2:
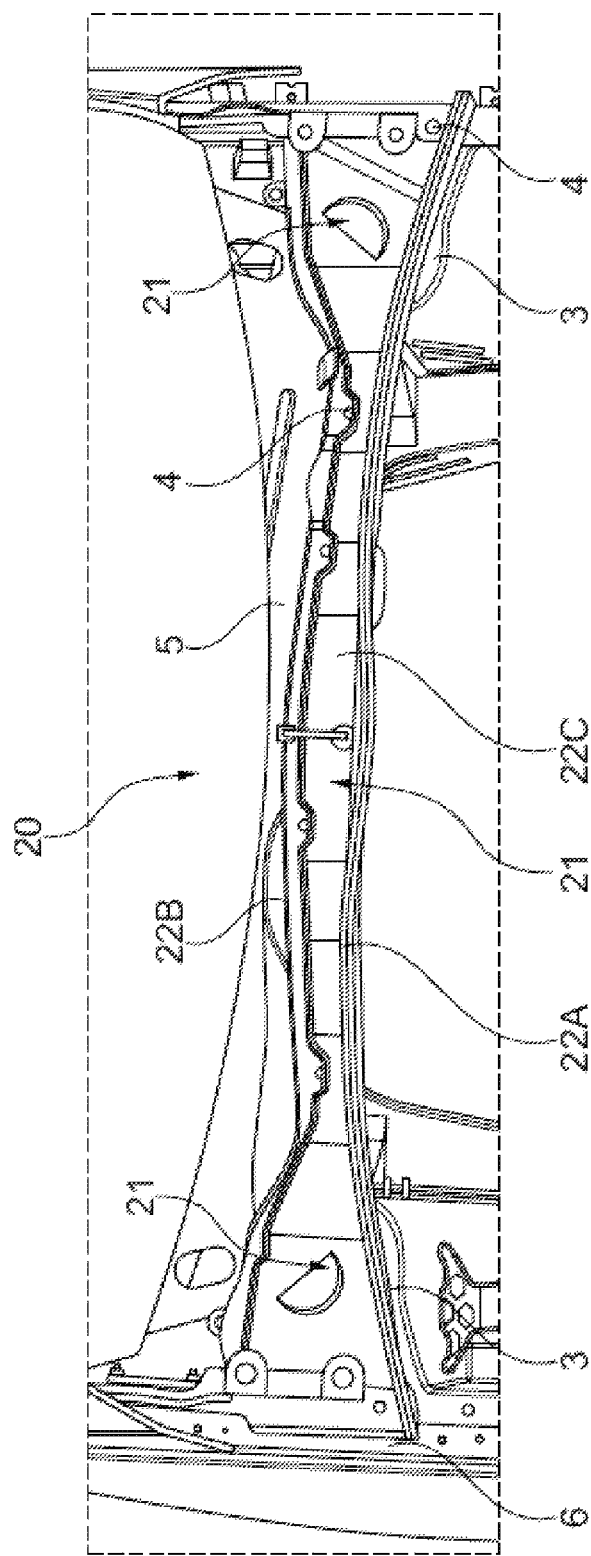
FIG. 2 shows a plan view of a service panel of the panel arrangement with removed air inlet panel in a view corresponding to FIG. 1.
Figure 3:
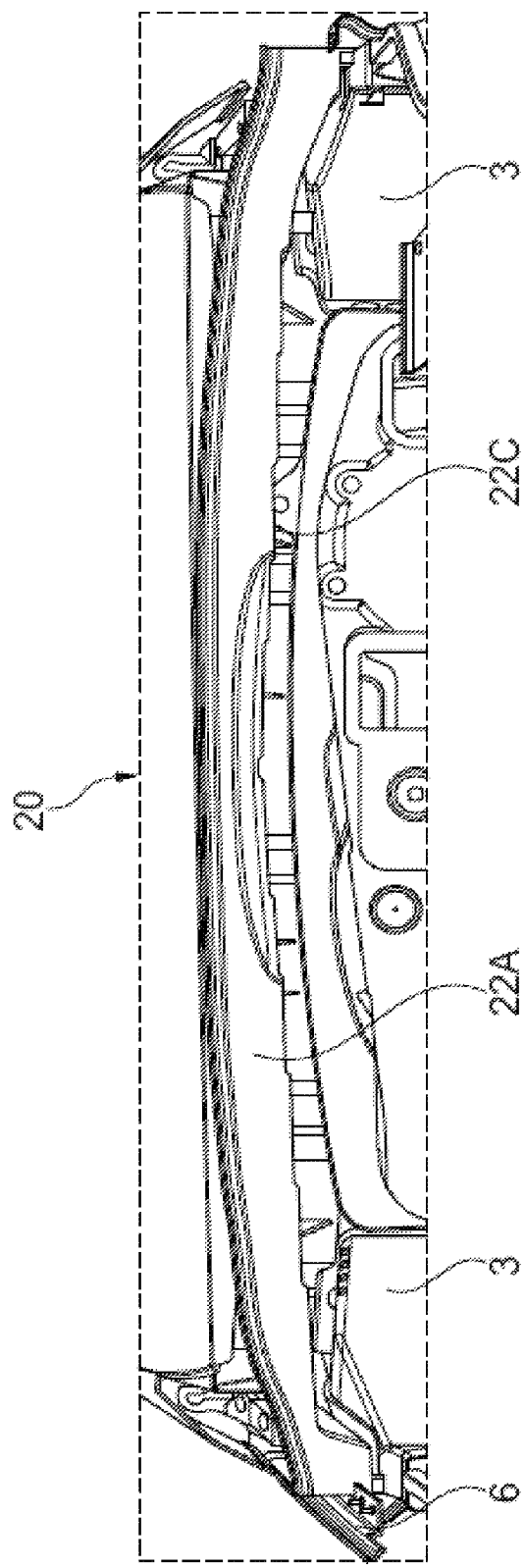
FIG. 3 shows a front view of the service panel in the vehicle longitudinal direction from in front.
Figure 4:
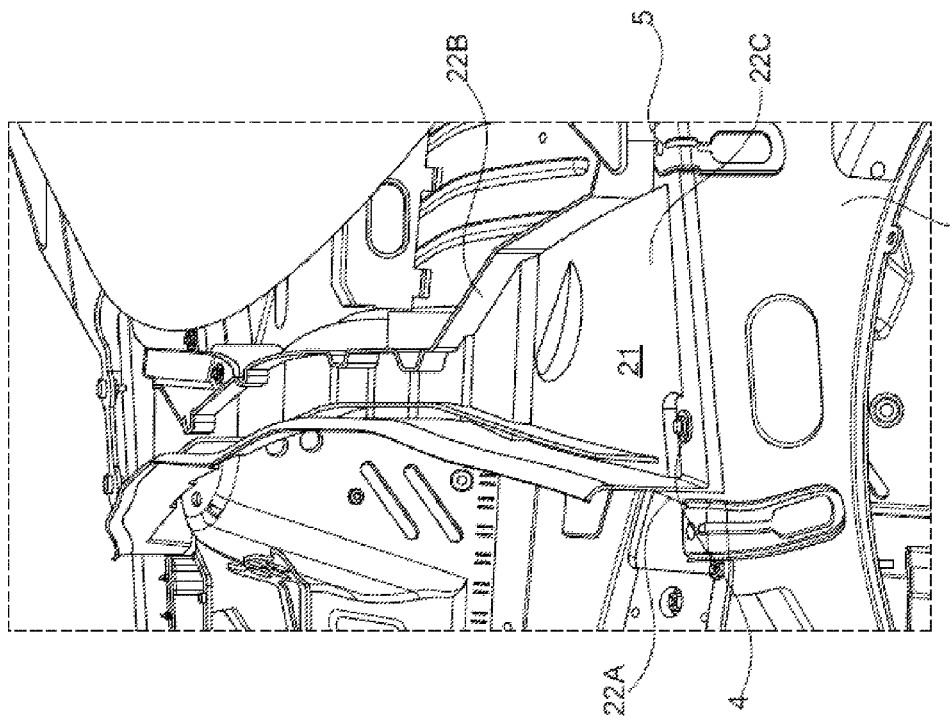
FIG. 4 shows a perspective side view of the service panel in the vehicle transverse direction.
Figure 5:
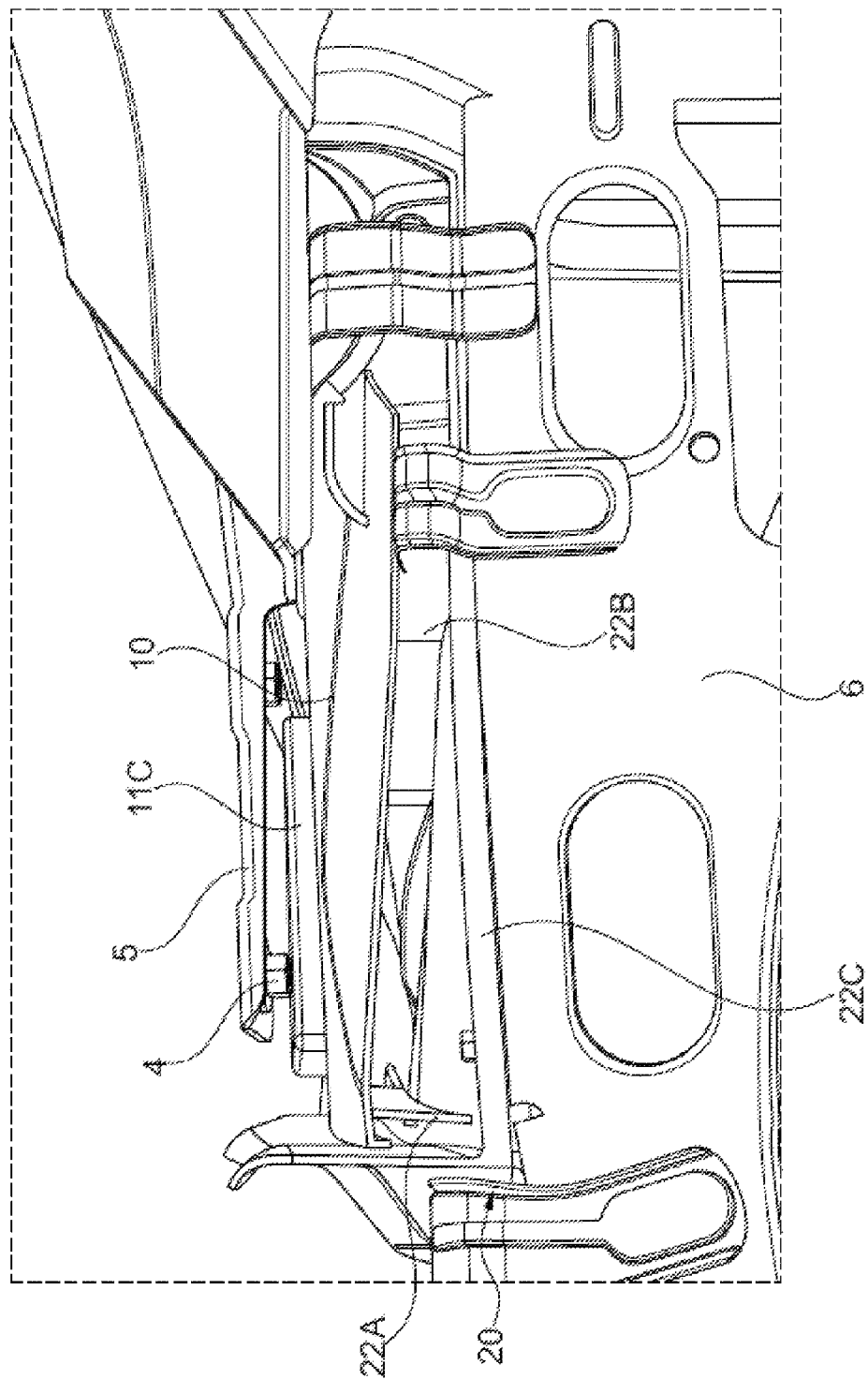
FIG. 5 shows a side view of the panel arrangement in the vehicle transverse direction.

FIG. 1 shows a plan view of a panel arrangement of a motor vehicle according to one embodiment of the present disclosure in the vehicle vertical direction from above. FIG. 5 shows a side view of the panel arrangement in the vehicle transverse direction with a first or air inlet panel 10 and a second or service panel 20 of the panel arrangement. FIGS. 2-4 show service panel 20 of the panel arrangement with removed air inlet panel 10 from above (FIG. 2), from in front (FIG. 3) and from the side (FIG. 4).

Air inlet panel 10 includes a central air passage region 11A with a plurality of air passages 12 for the through-flow with ambient air.

Service panel 20 (see FIG. 2) includes a continuous water-collecting region 21 which, in the assembly position of the panel arrangement in the motor vehicle represented in the figures in the vehicle vertical direction (vertical in FIG. 4, 5), is arranged beneath air passage regions 11A-11C of air inlet panel 10 and thus drains water entering through air passages 12 in the vehicle transverse direction towards two wheel wells 6 of the motor vehicle lying opposite one another in the vehicle transverse direction.

Air passages 12 are constituted by perforated regions in air inlet panel 10. In each case a plurality of air passages 12 which are jointly surrounded by an air passage-free region of air inlet panel 10 form an air passage region 11A-11C of air inlet panel 10.

Water-collecting region 21 is open on both sides in the vehicle transverse direction in order to drain water to the two wheel wells 6 of the motor vehicle.

Air passage regions 11A-11C of air inlet panel 10 are each spaced apart, in the vehicle transverse direction, by at least 2% of the total extension at air inlet panel 10 by an air passage-free closed region of air inlet panel 10. The closed region extending correspondingly in the vehicle transverse direction in each case over at least 2% of the total extension of air inlet panel 10.

Water-collecting region 21 includes an anterior or front (viewed in the assembly position in the vehicle longitudinal direction) closed end wall 22A (bottom in FIG. 2, left-hand in FIG. 5) for guiding water to be drained. The end wall in the assembly position extends in the vehicle vertical and transverse direction and continuously forms with the vehicle vertical direction an angle of at most 15°. In addition, water-collecting region 21 includes a—viewed in the assembly position in the vehicle longitudinal direction—rear closed end wall 22B (top in FIG. 2, right-hand in FIG. 5) for guiding water to be drained, said end wall in the assembly position extending in the vehicle vertical and transverse direction, wherein it continuously forms with the vehicle vertical direction an angle of at most 15°. Front and rear end wall 22A, 22B extend in the vehicle transverse direction over at least 90% of the total extension of the service panel 20 in the vehicle transverse direction.

Front end wall 22A is curved in a convex manner. Front and rear end wall 22A, 22B diverge from one another in the two mutually opposite (vehicle)-side end regions (left-hand, right-hand in FIG. 2) over at least 10% of a total extension of the service panel in the vehicle transverse direction. Front and rear end wall 22A, 22B are integrally connected to one another by a closed bottom wall 22C to form a channel continuous in the vehicle transverse direction for the two-sided drainage of water in the vehicle transverse direction.

As can be seen in particular in FIG. 3, bottom wall 22C, viewed in the assembly position in the motor vehicle transverse direction, falls away at both vehicle sides in the vehicle vertical direction and overlaps two suspension strut domes 3 of the motor vehicle.

As can be seen in particular in FIG. 4, a bottom wall 22C includes two shoulders lying opposite one another in the vehicle transverse direction, which shoulders project beyond rear end wall 22B of service panel 20, fall away in the vehicle vertical direction (see below in FIG. 4) and are screwed to a bodywork 5 of the motor vehicle. Air inlet panel 10 and service panel 20 are each produced in one piece from plastic. Air inlet panel 10 includes a plurality of assembly openings 13 (still closed in FIG. 1) for the fixing of a windscreen wiper.

It also drains water in the vehicle transverse direction. For this purpose, it includes a—viewed in the assembly position in the vehicle longitudinal direction—front closed end wall 14A (bottom in FIG. 1) and a—viewed in the assembly position in the vehicle longitudinal direction—rear closed end wall 14B (top in FIG. 1) for guiding water to be drained, said end walls extending in the assembly position in the vehicle vertical and transverse direction over at least 90% of a total extension of air inlet panel 10 in the vehicle transverse direction.

Water which has not already been drained through end walls 14A, 14B of air inlet panel 10 in the vehicle transverse direction to wheel wells 6, but rather passes through its air passage regions 11A-11C onto service panel 20 arranged beneath, is drained through its end walls 22A, 22B also in the vehicle transverse direction to wheel wells 6 (see in particular FIG. 5).

Air inlet panel 10 and service panel 20 are connected detachable by screws 4 to bodywork 5 of the motor vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A panel arrangement for a motor vehicle, comprising:
an air inlet panel having an air passage region with an air passage for the through-flow with ambient air; and
a service panel having a water-collecting region subjacent to the air passage region, the water-collecting region including a front end wall, a rear end wall, and a bottom wall that is closed in entirety, the front end wall and the rear end wall connected by the bottom wall, the front end wall, the rear end wall and the bottom wall forming a channel that is continuous in the vehicle transverse direction, wherein the water-collecting region is configured to drain water in the vehicle transverse direction of the motor vehicle.

2. The panel arrangement according to claim 1, wherein the air inlet panel comprises a second air passage region with a second air passage spaced apart from the air passage region in the vehicle transverse direction by at least 2% of a total extension of the air inlet panel, the air passage regions separated by an air passage-free region and the air passages comprising perforated regions in the air inlet panel, wherein the water-collecting region is subjacent to the second air passage region.

3. The panel arrangement according to claim 1, comprising a pair of suspension strut domes disposed on opposite sides of the vehicle, wherein the water-collecting region extends in the vehicle transverse direction over at least 75% of a total extension of the service panel, and the channel extends over each of the suspension strut domes.

4. The panel arrangement according to claim 3, wherein the channel is disposed above the suspension strut domes and is configured to direct all water collected in the channel over the suspension strut domes.

5. The panel arrangement according to the claim 3, comprising a pair of wheel wells, one of which is positioned outboard, in the vehicle transverse direction, from each respective one of the suspension strut domes, wherein the channel extends in the vehicle transverse direction across the vehicle in an uninterrupted configuration, and wherein the channel includes a pair of end walls that are open, the channel configured to direct all collected water through the ends walls and into the wheel wells.

6. The panel arrangement according to claim 5, wherein the bottom wall in the assembly position in the vehicle transverse direction falls away to at least one side of the vehicle at a location outboard from each suspension strut dome.

7. The panel arrangement according to claim 5, wherein the service panel comprises a structure that is unitary and is detachably connected to the vehicle.

8. The panel arrangement according to claim 7, wherein the air inlet panel and the service panel each comprise a one piece, plastic molded part.

9. The panel arrangement according to claim 1, wherein the air inlet panel includes a front closed end wall and a rear closed end wall and is configured for guiding water to drain in the vehicle transverse direction.

10. The panel arrangement according to claim 9, wherein the air inlet panel defines an assembly opening configured to receive a windscreen wiper and disposed between the front closed end wall and the rear closed end wall.

11. A motor vehicle comprising:
a vehicle body defining first and second wheel wells lying opposite one another in a vehicle transverse direction on opposite sides of the vehicle;
a first suspension strut dome adjacent the first wheel well;
a second suspension strut dome adjacent the second wheel well;
a service panel having a water-collecting region configured to drain water in the vehicle transverse direction of the motor vehicle, the water-collecting region including a front end wall and a rear end wall connected with the front end wall by a bottom wall, the front end wall, the rear end wall and the bottom wall forming a channel that is continuous in the vehicle transverse direction, wherein the channel extends in the vehicle transverse direction across each of the suspension strut domes and includes a pair of end walls that are open, one of the end walls located outboard in the vehicle transverse direction relative to each one of the suspension strut domes, the channel configured to direct all collected water through the ends walls and into the first and second wheel wells; and
an air inlet panel covering the channel and having an air passage region with an air passage for the through-flow of ambient air, the air passage region opening into the channel, wherein the air inlet panel includes a front closed end wall and a rear closed end wall and is configured for guiding water to drain in the vehicle transverse direction and into the wheel wells.

12. The motor vehicle according to claim 11, wherein the air inlet panel and the service panel each comprise a one-piece part that is detachably secured the vehicle body of the motor vehicle.

13. A panel arrangement for a motor vehicle, comprising:
an air inlet panel having an air passage region with an air passage for the through-flow with ambient air; and
a service panel having a water-collecting region subjacent to the air inlet panel, the water-collecting region including a front end wall, a rear end wall, and a closed bottom wall connecting the front end wall and the rear end wall, the closed end wall being entirely closed, and the front end wall, the rear end wall and the closed bottom wall forming a channel that is continuous in a vehicle transverse direction, wherein the channel includes open end walls on opposite sides of the vehicle in the vehicle transverse direction, and the channel is configured to drain all water collected in the channel through the open end walls.

* * * * *